United States Patent [19]

Braaten

[11] 4,222,108
[45] Sep. 9, 1980

[54] DIGITALLY-PROGRAMMED ARBITRARY WAVEFORM GENERATOR

[76] Inventor: Norman J. Braaten, 2105 King Rd., Eagan, Minn. 55122

[21] Appl. No.: 965,235

[22] Filed: Dec. 1, 1978

[51] Int. Cl.² ........................ G06J 1/00; G06F 15/34
[52] U.S. Cl. .................................. 364/608; 364/719
[58] Field of Search ............... 364/718, 719, 720, 721, 364/600, 607, 608, 521; 328/14; 340/739, 740, 799, 800

[56] References Cited

U.S. PATENT DOCUMENTS

| | | | |
|---|---|---|---|
| 3,506,812 | 4/1970 | Rosener | 364/720 |
| 3,529,138 | 9/1970 | Andre et al. | 364/718 |
| 3,576,432 | 4/1971 | Braaten | 364/607 |
| 3,621,228 | 11/1971 | Paine | 364/718 |
| 3,662,160 | 5/1972 | Hoppes | 364/718 |
| 3,691,551 | 9/1972 | Kashio | 364/719 X |
| 3,716,705 | 2/1973 | Newell | 364/518 |
| 3,727,037 | 4/1973 | Zorn | 364/608 |
| 3,729,625 | 4/1973 | Inoue | 364/718 |
| 3,739,374 | 6/1973 | Kiowski | 364/721 X |
| 3,763,364 | 10/1973 | Deutsch et al. | 364/718 |
| 3,822,380 | 7/1974 | Forgione | 364/718 |
| 3,836,902 | 9/1974 | Okuda et al. | 364/718 X |
| 3,917,932 | 11/1975 | Saita et al. | 364/718 |
| 3,962,573 | 6/1976 | Staley | 364/718 X |
| 4,023,027 | 5/1977 | Strathman et al. | 364/720 |
| 4,064,423 | 12/1977 | Atkisson, Jr. | 364/718 |

OTHER PUBLICATIONS

Model 175 Arbitrary Waveform Generator, Wavetek San Diego, 9045 Balboa Ave., P.O. Box 651, San Diego, Ca. 92112.

*Primary Examiner*—Joseph F. Ruggiero
*Attorney, Agent, or Firm*—Kinney, Lange, Braddock, Westman and Fairbairn

[57] ABSTRACT

A digital system for generating waveforms includes a word oriented digital memory which stores a plurality of digital words containing data and instructions. The words of the word oriented digital memory are addressed in a predetermined order, and the instructions contained within each word are executed. These instructions include loading data into either an amplitude comparison register, an amplitude output register, or a variable clock, performing a ramp operation, or performing a time delay operation. Waveforms are generated using slope segments, amplitude jumps, and amplitude plateaus.

30 Claims, 4 Drawing Figures

DIGITALLY-PROGRAMMED ARBITRARY WAVEFORM GENERATOR

BACKGROUND OF THE INVENTION

1. Field of the Invention

The present invention relates to apparatus for generating waveforms. In particular, the present invention relates to digital electronic apparatus for synthesizing electrical analog or digital waveforms.

2. Description of the Prior Art

In the past, various forms of arbitrary function generators have been used and proposed for a wide variety of applications. For example, the ability to generate arbitrary time varying electrical signals is required in process control systems, machine control systems for controlling the motion of a machine to create a desired contour or profile, laboratory test systems to create laboratory test waveforms, cathode ray tube controls for generating deflection voltage or current waveforms, and systems for synthesizing or simulating various physiological waveforms which may be produced or created within a living organism.

In the past, time varying electrical signals have been provided by electro-mechanical systems. For example, in one common type of system, a cam is formed having a profile which corresponds to a desired waveform. A cam follower follows the cam profile, and the movement of the cam follower is converted to an electrical analog signal by means of a potentiometer. Similar techniques have been used in which a waveform is drawn on a conductive layer, and a servo system drives a probe which follows the waveform. Once again, a potentiometer linked to the probe generates the analog waveform.

It is apparent that these electro-mechanical systems have significant disadvantages. They are limited in speed and accuracy. In addition, due to their mechanical nature, they are subject to wear.

To overcome the disadvantages of the prior art electro-mechanical systems, various electronic systems have been proposed which are capable of generating arbitrary time varying waveforms. One particularly advantageous approach to the generation of arbitrary waveforms uses digital electronic devices. Electrical waveform generators of this type provide the potential of higher speed operation and higher accuracy than is possible with electro-mechanical systems. In addition, the rapid advances in digital integrated circuits have made this type of system particularly attractive. The following patents describe digital systems which generate time varying waveforms.

3,506,812-Rosener
3,529,138-Andre
3,621,228-Paine
3,662,160-Hoppes
3,691,551-Kashio
3,716,705-Newell
3,727,037-Zorn
3,739,374-Kiowski
3,763,364-Deutsch
3,729,625-Inoue
3,822,380-Forgione
3,836,902-Okuda
3,917,932-Saita
3,962,573-Staley
4,023,027-Strathman
4,064,423-Atkisson Some digital function generators have used a point-by-point approach. Every resolvable point of the curve is stored in a separate address in digital memory. The address itself is the time coordinate, and the number stored at that address is the magnitude coordinate. This approach, however, has many disadvantage The most significant disadvantage is that it requires an excessive amount of memory storage for even a small and simple waveform.

Another approach used by some digital waveform generators is to approximate the waveform by multiple line segments. This is typically achieved in a digital system by means of a counter which is driven by a pulse rate multiplier. U.S. Pat. No. 3,529,138 by S. N. Andre et al describes one function generator of this type. This function generator however, is extremely limited in its capabilities. The system allows only six input pulse rates. While this may be acceptable for generating relatively simple time varying waveforms, the generation of complex waveforms at high speed and high resolution is not possible with the generator of the Andre patent.

Two other patents which describe producing arbitrary functions by sequentially connected linear ramp segments are U.S. Pat. No. 3,662,160 by Hoppes, and U.S. Pat. No. 4,064,423 by Atkisson, Jr. In each of these patents, every slope segment requires one line of program (i.e. one stored digital word). In the Hoppes patent each program word contains both the new end point and the specified time increment for reaching it. Hardware is provided to subtract the previous end point from the new end point and obtain an amplitude increment. By hardware means, the amplitude increment is divided by the time increment to get a velocity value which is then used as a control input to the input pulse rate multiplier. In addition, since every word contains both a new end point, and a specified time increment, the number of bits of resolution for the end points and time increments is extremely limited, unless excessively long words are used.

In the Atkisson, Jr. patent, as in the Hoppes patent, each slope segment requires one line of program (i.e. one word). In the Atkisson, Jr. patent, the program word contains the desired amplitude change, the desired time change, and the sign (+ or −) of the slope of the segment being generated. Once again, hardware is required to convert the amplitude change and time change to the desired pulse rate which drives a counter. The Atkisson, Jr. wave generator, like the Hoppes generator, therefore, requires special hardware to perform the mathematical operations necessary to produce the necessary slope value of each segment. In addition, resolution is extremely limited, since each word must contain the amplitude change and time change.

Despite the variety of proposed digital systems for generating waveforms, the utilization of systems of this type has been relatively limited. Most waveform generators have been developed for a specific use or purpose, and have been unable to meet all of the various requirements for the different application areas of an arbitrary waveform generator. The prior art digital systems have one or more significant disadvantages. First, many are limited in the kinds of waveforms and the resolution which is achieved. Second, many are difficult to use or program. Third, many require excessive hardware and/or memory capacity. Fourth, most are limited to providing singleaxis waveforms. There remains a need for digital waveform generators which are capable of generating a wide variety of complex arbitrary waveforms and yet are simple to use, simple to program, and have a minimum of hardware and operating complexity.

SUMMARY OF THE INVENTION

The digitally programmed arbitrary waveform generator of the present invention generates waveforms by means of slope segments, amplitude plateaus, and amplitude jumps, which are group-repetitive by means of a program jump back to a starting point of the waveform. In one embodiment the present invention includes word oriented digital memory means, memory address means, instruction execution means, variable clock means, amplitude output register means, amplitude comparison register means, comparator means and detect means.

The word oriented digital memory means stores a plurality of digital words containing data and instructions. To generate a desired waveform, the memory address means addresses selected digital words in the word oriented memory means in a predetermined order. The instruction execution means executes the instruction contained in each digital word which is selected by the memory address means. These instructions include: (1) load operations for loading data from the digital word into the amplitude output register means, the amplitude comparison register means or the variable clock means, (2) a ramp operation for enabling the amplitude output register means to count, in response to pulses from the variable clock means, toward an end point count contained in the amplitude comparison register means, and (3) a time delay operation for enabling the amplitude comparison register means to count, in response to pulses from the variable clock means, toward a predetermined count such as zero.

To generate a slope segment, the intended end point count is loaded into the amplitude comparison register means and a digital slope rate signal is loaded into the variable clock means which determines the frequency of pulses produced by the variable clock means. The ramp operation is then commenced, and the amplitude output register means is counted until the comparator means produces an output signal indicating the counts of the amplitude output register means and the amplitude comparison register are equal. This then indicates to the memory address means that the ramp operation is complete, and the next selected digital word may be addressed.

Amplitude plateaus or time delays are also generated in a simple manner. The amplitude comparison register means is loaded with a time delay count. The instruction execution means then enables the amplitude comparison register means to count toward a predetermined count, such as zero, in response to pulses from the variable clock means. The detect means detects when the count in the amplitude comparison register means reaches the predetermined count and provides an output signal which indicates to the memory address means that the time delay operation is completed. The memory address means then addresses the next selected digital word in the word oriented digital memory means.

Amplitude jumps are provided simply by reloading the amplitude output register means with the new desired amplitude value which may be a larger or smaller count and of the same or different sign than the previous count contained in the amplitude output register means.

DETAILED DESCRIPTION OF THE PREFERRED EMBODIMENTS

Figure 1:
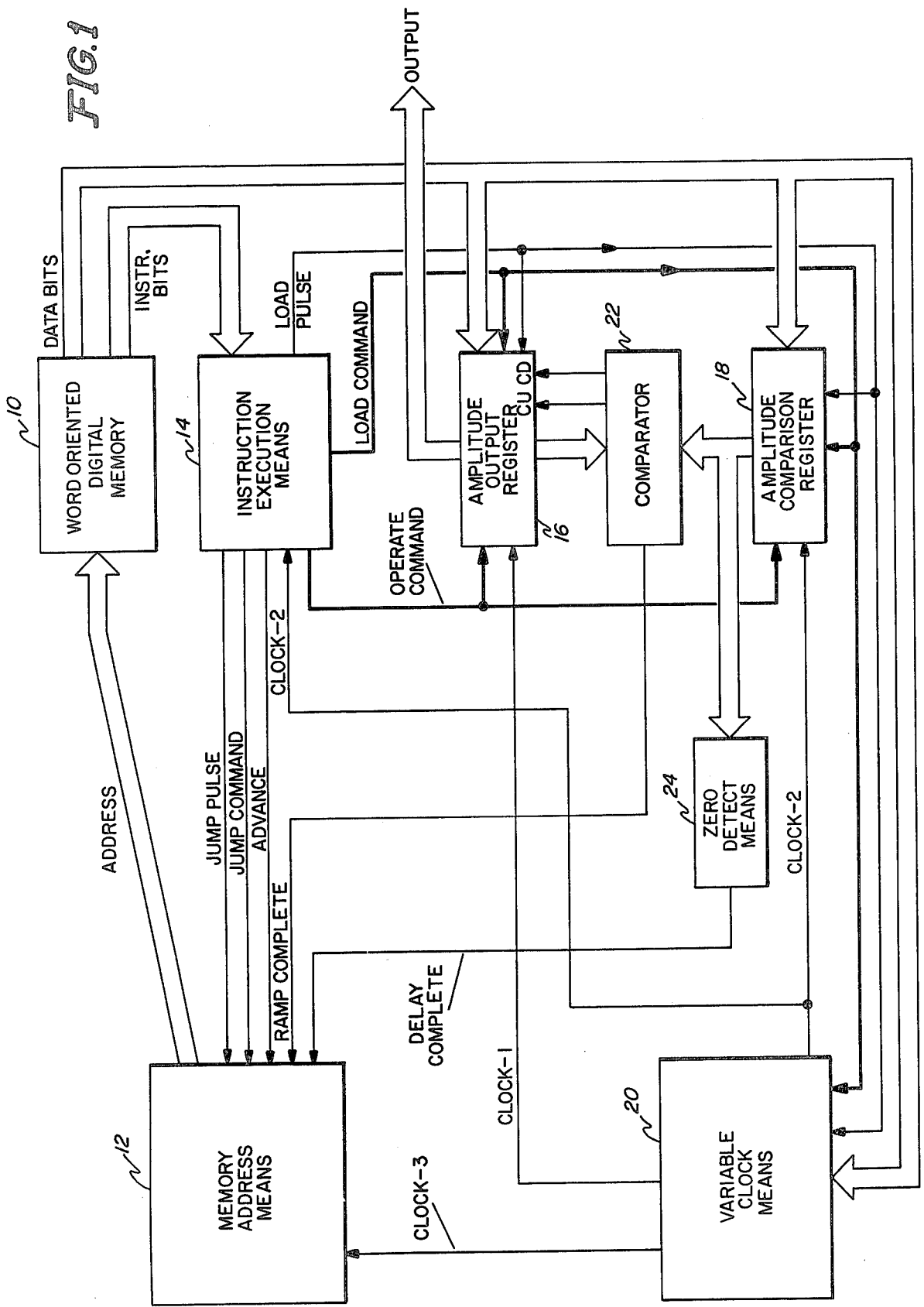
FIG. 1 is an electrical block diagram of the digitally programmed arbitrary waveform generator of the present invention.

The Waveform Generator of FIG. 1

FIG. 1 shows a block diagram of a preferred embodiment of the digitally-programmed arbitrary waveform generator of the present invention. The device of FIG. 1 makes use of the fact that a curved pattern or waveform can be approximated to any desired degree of precision by a continuum of straight line segments. The invention recognizes that it is not necessary to store the magnitude of every point of a straight line. Instead, time varying waveforms may be generated by means of slope segments, amplitude plateau segments, and amplitude jumps. In addition, the present invention is also capable of simulating waveforms in the form of closely spaced individual interpolation points.

The device of FIG. 1 includes a word oriented digital memory 10, which contains multibit words. Each word contains instruction bits and data bits. In one preferred embodiment of the present invention, word oriented digital memory 10 is a programmable read only memory (PROM) containing the words of sixteen bits each. Word oriented memory 10, however, may also be locally programmed random access memory (RAM), or may be external memory, such as provided by an external computer.

In the preferred embodiment in which each word contains sixteen bits, four bits are assigned as instruction bits, including one bit which is a polarity or sign (+ or −) bit. This polarity bit is also used, in a preferred embodiment, to select either a high master clock range (e.g. 10 MHz) or a low master clock range (e.g. 10 kHz). Thirteen bits (including the polarity bit) are data bits. Memory address means 12 addresses words contained in a word oriented digital memory 10 in a predetermined order. When a particular word is addressed, the instruction bits are provided to instruction execution means 14. The data bits are provided to amplitude output register 16, amplitude comparison register 18, or variable clock means 20, depending upon the particular instruction contained within the instruction bits.

In a preferred embodiment of the present invention, the entire operation of the waveform generator is controlled by only ten instructions. These instructions are listed in the following table:

TABLE 1

| | |
|---|---|
| 0 | NOP (No Operation) or Trigger(s) |
| 1 | Load Slope Multiplier |
| 2 | Load Amplitude Output Register Negative |
| 3 | Ramp Command |

4 Load Amplitude Comparison Register Negative
5 Address Return Jump
6 Program Stop(s)
7 Delay Command (and Independent Output Select)
A Load Amplitude Output Register Positive
C Load Amplitude Comparison Register Positive Instruction execution means 14 decodes the instruction bits and provides a variety of signals. These signals include the JUMP PULSE, JUMP COMMAND, and ADVANCE signals which are provided to memory address means 12, the LOAD PULSE signal, the LOAD COMMAND signal which is a multi-bit digital signal which selects either amplitude output register 16, amplitude comparison register 18, or variable clock means 20 to respond to the LOAD PULSE signal, and the OPERATE COMMAND signal which is a multi-bit digital signal which selects either amplitude output register 16 or amplitude comparison register 18 for a Ramp or Delay operation. In one preferred embodiment, the three instruction bits are used as the JUMP COMMAND or LOAD COMMAND signal.

The output of the waveform generator of FIG. 1 is derived from the count contained within amplitude output register 16. The digital count may be converted to an analog signal by means of a digital-to-analog converter (not shown in Figure), or may be used directly in cases where digital data is desired.

The waveform generator of FIG. 1 also includes a comparator 22, which compares the output count contained in amplitude output register 16 with the end point count contained in amplitude comparison register 18. When the output count in amplitude output register 16 equals the end point count contained in amplitude comparison register 18, comparator 22 provides a RAMP COMPLETE signal to memory address means 12. This RAMP COMPLETE signal indicates that a slope segment operation is completed, and memory address means 12 should advance to the next address. In addition, comparator 22 provides COUNT-UP and COUNT-DOWN signals to amplitude output register 16 depending on the respective signs of the output and end point counts and whether the magnitude of the output count is greater than or less than the magnitude of the end point count.

Zero detect means 24 also receives the output of amplitude comparison register 18. Zero detect means 24 supplies a DELAY COMPLETE signal to memory address means 12 when amplitude comparison register 18 reaches a predetermined count, preferably zero. This DELAY COMPLETE signal indicates to memory address means 12 that an amplitude plateau operation is completed, and memory address means 12 should advance to the next address.

Variable clock means 20 supplies three clock signals, designated CLOCK-1, CLOCK-2, annd CLOCK-3. The CLOCK-1 signal is supplied to amplitude output register 16, and is used during the generation of slope segments. The CLOCK-2 signal is supplied to amplitude comparison register 18 and is used during the amplitude plateau operation. In addition, the CLOCK-2 signal is supplied to and defines the cycle rate of instruction execution means 14. Both the CLOCK-1 and CLOCK-2 signals are variable as a function of the data bits which are supplied to variable clock means 20. The CLOCK-3 signal is supplied to memory address means 12.

The generation of successive slope segments involves only a small number of operational steps. First, at the beginning of the first slope segment, instruction execution means 14 receives a Load Amplitude Output Register instruction and provides LOAD COMMAND and LOAD PULSE signals. The LOAD COMMAND signal selects amplitude output register 16 and causes the data bits of the word to be loaded into amplitude output register 16 in response to the LOAD PULSE signal. These data bits represent the desired starting point of the first slope segment. When this loading operation is completed, instruction execution means 14 provides an ADVANCE signal to memory address means 12, which then addresses the next word in the sequence.

Second, instruction execution means 14 receives a Load Amplitude Comparison Register instruction, and provides LOAD PULSE and LOAD COMMAND signals. The LOAD COMMAND signal selects amplitude comparison register 18, and causes the data bits to be loaded into amplitude comparison register 18 in response to the LOAD PULSE signal. These data bits represent the desired end point of the slope segment. When this operation is complete, instruction execution means 14 again provides the ADVANCE signal to memory address means 12, and the next word of the sequence is addressed.

Third, instruction execution means 14 receives a Load Slope Multiplier instruction. Instruction execution means 14 provides a LOAD COMMAND signal which selects variable clock means 20. The data bits are loaded into variable clock means 20 in response to the LOAD PULSE signal. These data bits represent the desired slope or velocity of the slope segment. Variable clock means 20 produces the CLOCK-1 signal as a function of these data bits. When this Load instruction is completed, instruction execution means 14 again provides an ADVANCE signal to memory address means 12.

These loading operations, during which data is loaded into registers 16 or 18 or into variable clock 20, are performed at very high rates. Typically there is no noticeable aberration in the waveform because the loading operations take an insignificant amount of time in comparison to the time duration of any particular slope segment.

Fourth, instruction execution means 14 receives a Ramp Command instruction. Instruction execution means 14 provides OPERATE COMMAND signal to amplitude output register 16, which then begins counting in response to the CLOCK-1 signal. The count in amplitude output register 16 is compared to the desired end point count contained in amplitude comparison register 18 by comparator 22. Depending on whether the count in amplitude output register 16 has the same or different sign and whether its magnitude exceeds or is less than the desired end point count contained in amplitude comparison register 18, comparator 22 provides a COUNT-UP or COUNT-DOWN signal to amplitude output register 16.

In the preferred embodiments of the present invention, comparator 22 determines whether a COUNT-UP or COUNT-DOWN signal is produced based upon the following logic rules. If the output count in amplitude output register 16 has the same polarity (+ or −) as the end point count in amplitude comparison register 18 and the magnitude of the output count is less than the magnitude of the end pount count, a COUNT-UP signal is produced. In all other cases, a COUNT-DOWN signal is produced. In addition, if the output count reaches zero and is still not equal to the end point count, comparator 22 causes the polarity of the output count to change.

The count contained in amplitude output register 16 continues to be incremented or decremented at the rate determined by the CLOCK-1 signal until it equals the desired end point count. At that point, comparator 22 provides a RAMP COMPLETE signal to memory address means 12 which indicates that the ramp operation is completed, and the output of amplitude output register 16 has attained the end point of the slope segment. Memory address means 12 then advances the address to the next word in word oriented digital memory 10, and the ramp operation is terminated.

The next slope segment is even simpler to generate, since the starting point for the second slope segment is the output count which is contained in the amplitude output register 16 at the end of the first slope segment. To generate the second slope segment, amplitude comparison register 18 is loaded with a new desired end point count, variable clock means 20 is loaded with a new clock rate, and the OPERATE COMMAND signal is again provided to the amplitude output register 16 to begin counting toward the new end point count.

As just described, during the slope segment generation, amplitude comparison register 18 is used to contain the desired end point. During the generation of an amplitude plateau, amplitude comparison register 18 provides a second function. Although the plateau generation could be performed using a separate counter or register, the use of amplitude comparison register 18 for this function reduces the amount of electrical circuitry required.

To generate an amplitude plateau, in which the output count from amplitude output register 16 remains constant for a specified time period, the first word addressed by memory address means 12 contains a Load Amplitude Comparison Register instruction. Instruction execution means 14 provides LOAD PULSE and LOAD COMMAND signals which cause the data bits of the word to be loaded into amplitude comparison register 18. These data bits represent a time delay count. After this instruction is completed, instruction execution means 14 provides an ADVANCE signal to memory address means 12, which addresses the next word in the sequence.

The next word contains the Delay Command instruction, together with data bits which are supplied to variable clock means 20 to select the frequency of the CLOCK-2 signal. In one preferred embodiment four data bits are used to select one of four possible decades of frequency of the CLOCK-2 signal. Instruction execution means 14 provides an OPERATE COMMAND signal which selects and actuates amplitude comparison register 18, which begins counting in response to the CLOCK-2 signal. In the embodiment shown in FIG. 1, amplitude comparison register 18 is counted toward a predetermined count, which is preferably zero. Zero detect means 24 monitors the count in amplitude comparison register 18 during the time delay operation, and provides the DELAY COMPLETE signal when the count in amplitude comparison register 18 reaches zero. This DELAY COMPLETE signal indicates to memory address means 12 that the time delay for plateau operation is completed, and memory address means 12 should advance to the next address for the next operation.

In addition to the slope segment and amplitude plateau operations, the waveform generator of FIG. 1 also generates amplitude jumps, in which the output of amplitude output register 16 is changed abruptly, in either a positive or negative direction. The amplitude jump operation requires only a single word in word oriented memory 10. This word contains a Load Amplitude Output Register (either negative or positive) instruction. Instruction execution means 14 provides LOAD COMMAND and LOAD PULSE signals which cause the data bits from the word to be loaded into amplitude output register 16. These data bits represent the new output count of amplitude output register 16.

With the system of FIG. 1, a succession of close spaced interpolative points in any desired pattern may also be generated. This operation is performed with a sequence of words, each of which contains a Load Amplitude Output Register instruction, together with data bits representing the value of the output count for that individual point. This operation is performed at high speed, and is limited only by the cycle time of instruction execution means 14.

In many applications, it is desired that the waveform generator produce a repetitive waveform. The generator of FIG. 1 also includes an Address Return Jump instruction. This instruction causes instruction execution means 14 to provide both a JUMP COMMAND signal and the JUMP PULSE signal to memory address means 12. The Address Return Jump instruction does not advance the memory address, and in fact causes the address advance to be inhibited. Instead, when the JUMP COMMAND signal and JUMP PULSE signal are both present, memory address means 12 returns to a predetermined starting point address which represents the starting point of the program block for the desired waveform.

The waveform generator of FIG. 1 also preferably includes in its program repertoire a "NOP" or No Operation instruction. This instruction merely causes instruction execution means 14 to cycle. The ADVANCE signal which is produced at the end of the cycle advances memory address means 12 to the next word of the program. One advantageous use of the No Operation instruction is in providing output trigger pulses. For example, it is often desirable to produce a trigger output at certain points on the waveform. These trigger outputs may, for example, trigger an oscilloscope. In the waveform generator of the present invention, the data bits of a word containing a No Operation instruction may be used to provide these trigger outputs.

In addition to the trigger outputs, independent timed outputs may be provided using some or all of the unused data bits of a word containing a Delay Command instruction. The independent timed outputs last for the duration of the amplitude plateau created by the time delay, and may be used to actuate or deactuate a solenoid or a valve, or cause some other mechanical device to operate.

The program repertoire of the waveform generator of FIG. 1 also includes a Program Stop instruction. Ine one preferred embodiment, a program stop switch (not shown) is provided. If this program stop switch is set, the program and the operation of the generator stops when a word containing a program stop instruction is addressed. If the program stop switch is not set, the Program Stop instruction has no effect.

The waveform generator of the present invention is a general purpose waveform generator, which meets the requirements of a wide variety of application areas for an arbitrary waveform generator. In many cases, the requirements for different application areas differ as to resolution, accuracy, reliability, and cost.

For example, a general laboratory waveform generator must emphasize accuracy, convenience, and price. The user of a general laboratory generator is typically familiar with programming, and simplicity of programming is less of a consideration. The clock frequency of the generator must be in the medium to high range, and the resolution must be at least ±1,000. A single axis output is all that is required of the generator, and the waveform is the primary output. Although no independent timed outputs are likely to be needed, some programmed trigger outputs may be used with this type of generator.

A waveform generator for use in an industrial control system, on the other hand must be simple to program and extremely reliable; lost production time due to down time of the waveform generator can be costly. The clock frequency range required for an industrial control system is typically in the low to medium range. The cost may be a secondary consideration, since the waveform generator will typically be part of a much larger control system. The positioning accuracy (i.e. the accuracy of the output count) is extremely important, and the timing accuracy is generally less important. The resolution of the output count is typically about 1/10,000. Velocity may be an important parameter, particularly if a machine tool is being driven by the output of the generator. In addition, multiple independent timed outputs may be required.

A waveform generator for a cathode ray tube graphics display may preferably be modularized for inclusion in a larger system, or for add-on by the user. The accuracy of the waveform generator need only match the display, and resolution may be ±1,000. The clock frequency range is generally high. The graphics display usually requires input waveforms for two axes, and the beam modulation may also be required. No independent timed outputs are generally required for this application.

In a medical/biological waveform simulator, simplicity is extremely important. Safety is also important if there is an electrical connection to a human subject. Cost is generally a secondary factor in comparison to simplicity and safety. The accuracy of the simulator is moderate, and resolution of the output count need only be about ±250. Generally only a single axis waveform is required, and the waveform is the primary output of the simulator. The clock range for a waveform simulator is in the low to medium frequency range.

The present invention is capable of meeting the requirements for all of these applications. First, the accuracy and resolution of the waveform generator of the present invention meets the highest requirements of any of the applications discussed. Because the present invention uses multiple words, rather than a single word for each segment (as in some prior art systems), accuracy and resolution are not limited by word length. In the preferred embodiment shown in FIG. 1, twelve bits are used to define both the end point and the velocity or slope. This is achieved without impractical word lengths.

Second, the hardware of the waveform generator of the present invention is simple and less extensive than required in many prior art systems. This hardware simplicity yields high reliability and low cost. In particular, the waveform generator of the present invention, unlike some prior art systems, requires no subtraction or division, either by hardware or by software. This is the result of the use of multiple words, rather than a single word for each segment. Despite the use of multiple words, the waveform generator of the present invention has the advantage of data storage economy. In the case of slope segments, it is only necessary to store three words: one containing the slope or ramp rate; one containing the end point value; and one containing a ramp command. In the case of amplitude plateaus, it is necessary to store only two words: one containing the time delay count; and one containing a delay command. In the case of amplitude jumps, it is necessary to store only one word, which contains the new output value after the amplitude jump.

Third, the waveform generator of the present invention is easy to program. The program repertoire of instructions required for synthesizing any arbitrary waveform is very short. In the preferred embodiment shown in FIG. 1, the program repertoire consists of only ten instructions. In other embodiments of the present invention, even fewer instructions have been used to provide all needed functions for generating arbitrary waveforms. This simplifies programming as well as minimizing the amount of hardware required.

Fourth, the waveform generator of the present invention is useful in systems which require two axes drive, as in a cathode ray tube graphics display. The multi-word programming used in the present invention is particularly advantageous because it permits simultaneous generation of two or more output waveforms. A multiple output waveform embodiment of the present invention is described in detail later in this specification with regard to FIG. 4.

Fifth, the No Operation and Delay Command instructions used in the present invention, together with the data bits associated with those instructions, permit independent timed outputs and programmed trigger outputs, respectively, to be generated in conjunction with the waveform.

Sixth, in those systems utilizing computer control, the control instructions for the waveform generator of the present invention can be stored either in an internal word oriented memory 10 as shown in FIG. 1, or can be transmitted in digital form from an external control source such as a computer.

Seventh, the waveform generator of the present invention can provide output signals in either analog, parallel digital, or pulse rate format, depending upon the requirements of the application. The output of the generator, which is initially a digital signal, can be provided in any of these alternative formats.

Eighth, because the entire generating circuitry is digital, the problems of drift and other inaccuracies inherent in analog systems and electro-mechanical systems are eliminated.

Figure 2:
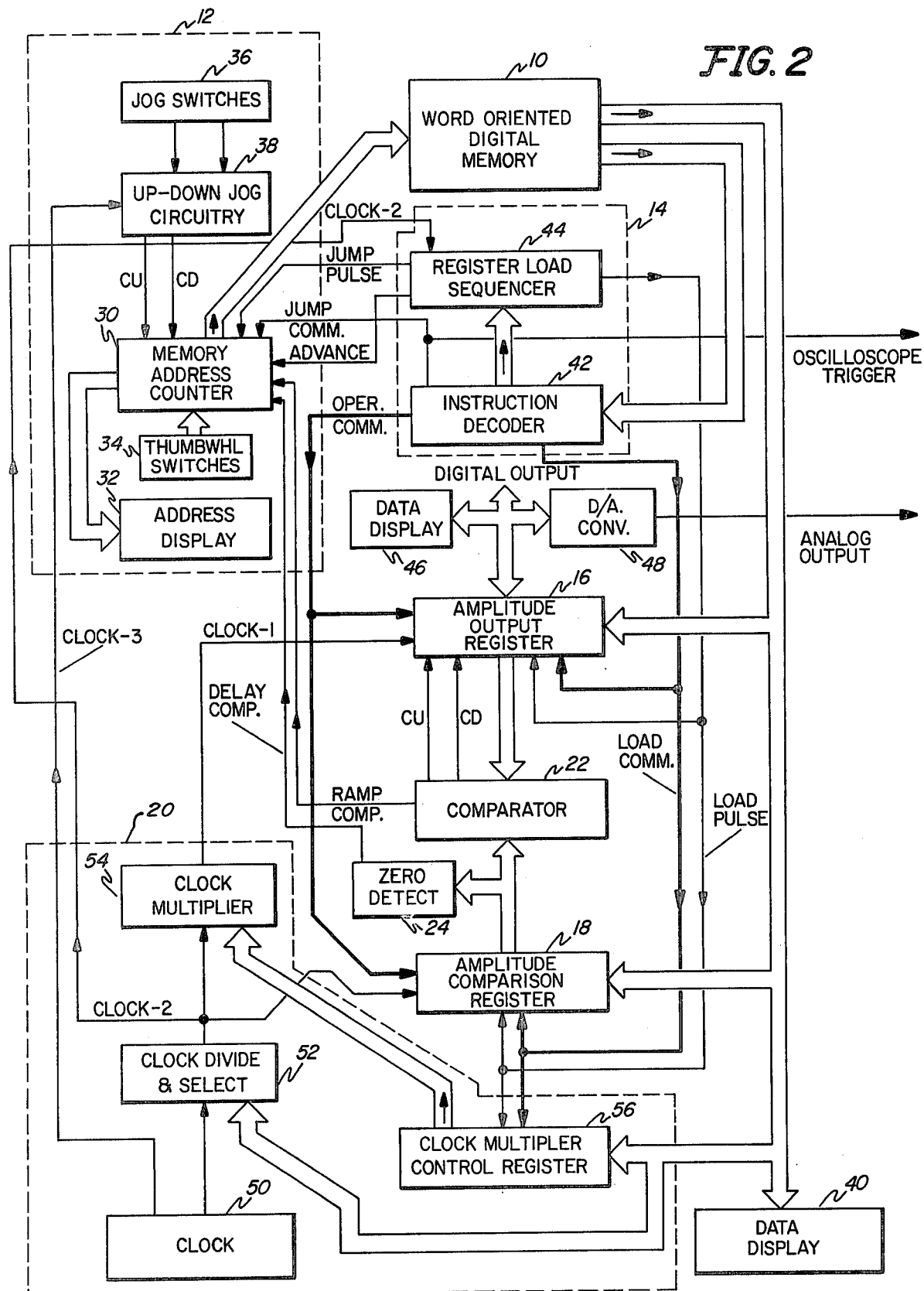
FIG. 2 is a more detailed electrical block diagram of a preferred embodiment of the digitally programmed arbitrary waveform generator of the present invention.

The Waveform Generator of FIG. 2

FIG. 2 shows a more detailed block diagram of a preferred embodiment of the waveform generator of FIG. 1. In FIG. 2, similar numerals have been used to designate similar elements to those shown in FIG. 1.

In FIG. 2, memory address means 12 includes a memory address counter 30. The output of memory address counter 30 is preferably an eight bit number which is supplied to word oriented digital memory 10. The address contained in memory address counter 30 is displayed on address display 32. A pair of hex panel thumbwheel switches 34 supply an input to memory address counter 30. The address contained in thumbwheel switches 34 indicates the desired starting point for a particular waveform. The operator selects the setting of thumbwheel switches 34 to select the waveform to be generated. In addition, thumbwheel switches 34 provide an alternative way to manually select an address for data entry or modification.

Also included in memory address means 12 are jog switches 36 and up-down jog circuitry 38. The memory address contained in memory address counter 30 can be slowly incremented or decremented by jog switches 36. Up-down jog circuitry 38 supplies either a COUNT-UP or COUNT-DOWN signal to memory address counter 30. The CLOCK-3 signal from variable clock means 20 is supplied to up-down jog circuitry 38, and determines the rate at which memory address counter 38 is counted up or down. The purpose of jog switches 36 and up-down jog circuitry 38 is to permit slow incrementing or decrementing of the address count for memory content modification and inspection purposes. Data display 40 receives the data contained within word oriented digital memory 10 and displays that data. In one preferred embodiment, an Auto/Manual switch (not shown) selects either an automatic or manual mode. When in automatic, execution of each instruction causes the address to advance. In the manual mode, which is selected when jog switches 36 are used, the memory address can be incremented or decremented for memory content inspection, and the execution of the instructions in the words can be inhibited.

Instruction execution means 14 includes instruction decoder 42 and register load sequencer 44. Instruction decoder 42 generates the LOAD COMMAND, OPERATE COMMAND, and JUMP COMMAND signals in response to the instruction bits from word oriented digital memory 10. In addition, it supplies a trigger signal to register load sequencer 44.

All of the instructions except the Ramp Command, the Program Stop and the Delay Command instructions trigger register load sequencer 44. In the preferred embodiment shown in FIG. 2, register load sequencer 44 is a three bit counter, which cycles through eight counts in response to the CLOCK-2 signal each time it is triggered by instruction decoder 42. During this operation, the CLOCK-2 signal is at its maximum frequency. One of the counter's eight states produces the LOAD PULSE signal, which loads data from memory 10 into the appropriate register signal selected by the LOAD COMMAND. A later state produces the JUMP PULSE signal. A still later state produces the ADVANCE signal, which causes the memory address to advance.

The Address Return Jump instruction does not advance the memory address in memory address counter 30. Instead, the Address Return Jump instruction causes instruction decoder 42 to produce the JUMP COMMAND signal. When the register load sequencer 44 produces the JUMP PULSE signal, the presence of both signals causes the contents of thumbwheel switches 32 to be loaded into memory address counter 30. This address value contained in thumbwheel switch 34 represents the starting point of the program block for the desired waveform.

As shown in FIG. 2, the output of the waveform generator (i.e. the output count of amplitude output register 16) is available in three different forms. First, the output is provided in parallel digital form as the digital output. Second, data display 46 displays the digital contents of amplitude output register 16 in human readable form. Third, the digital output of amplitude output register 16 is converted to an analog output by digital to analog converter 48. The analog output may be used together with the OSCILLOSCOPE TRIGGER signal to drive the cathode ray tube of an oscilloscope (not shown). The OSCILLOSCOPE TRIGGER signal is derived from the JUMP COMMAND signal produced by instruction decoder 42 when a waveform is completed and memory address counter 30 is reloaded with the starting address of the waveform.

Variable clock means 20 includes clock 50, clock divide and select circuitry 52, clock multiplier 54, and clock multiplier control register 56. Clock 50 provides a clock signal to clock divide and select circuitry 54, which divides the clock signal into four decades of clock frequency. One of these four decades is selected as the CLOCK-2 output of clock divide and select circuitry 52. The CLOCK-2 signal is supplied to amplitude comparison register 18, to clock multiplier 54, and to register load sequencer 44. In the preferred embodiment shown in FIG. 2, the particular decade frequency of the CLOCK-2 signal is selected by four data bits associated with either a Ramp Command instruction, or a Delay Command instruction. These four bits are supplied to clock divide and select circuitry 52 during the ramp (slope segment) and time delay (amplitude plateau) operations. As discussed previously, when the CLOCK-2 signal is driving register load sequencer 44, the highest clock frequency is selected, since it is desired to have register load sequencer 44 operate at the highest possible speed.

In one preferred embodiment, there are eight possible clock frequencies for the CLOCK-2 signal. These eight clock frequencies are all decimally related, and are in two ranges, high and low. The particular range is selected by the polarity bit. The choice within the particular range is made by one bit only of four bits (B9-B12). In the high range, the four data bits (bits b9, B10, B11, and B12) select 10 KHz, 100 KHz, 1 MHz, or 10 MHz, respectively. Similarly, in the low range, bit B12 selects 1 KHz, bit B11 selects 100 Hz, bit B10 selects 10 Hz, and bit B9 selects 1 Hz.

The CLOCK-3 signal is, in one preferred embodiment, supplied by a special low frequency oscillator (not shown) within Clock 50. In this embodiment, the low frequency oscillator produces a CLOCK-3 signal having a frequency of between about 6 Hz and 12 Hz.

Clock multiplier 54 is a rate multiplier whose output is the CLOCK-1 signal, which is supplied to amplitude output register 16. The frequency of the CLOCK-1 signal is dependent upon the frequency of the CLOCK-2 signal and upon the ramp rate data bits contained in clock multiplier control regiser 56.

When the Load Slope Multiplier instruction is received by instruction decoder 42, clock multiplier control register 56 receives a LOAD COMMAND signal indicating it is selected for loading data. The twelve data bits associated with the Load Slope Multiplier instruction are loaded into clock multiplier control register 56 in response to the LOAD PULSE signal from register load sequencer 44. The data bits are supplied to clock multiplier control regsiter 56, and thereby control the frequency of the CLOCK-1 signal during a ramp operation.

Figure 3:
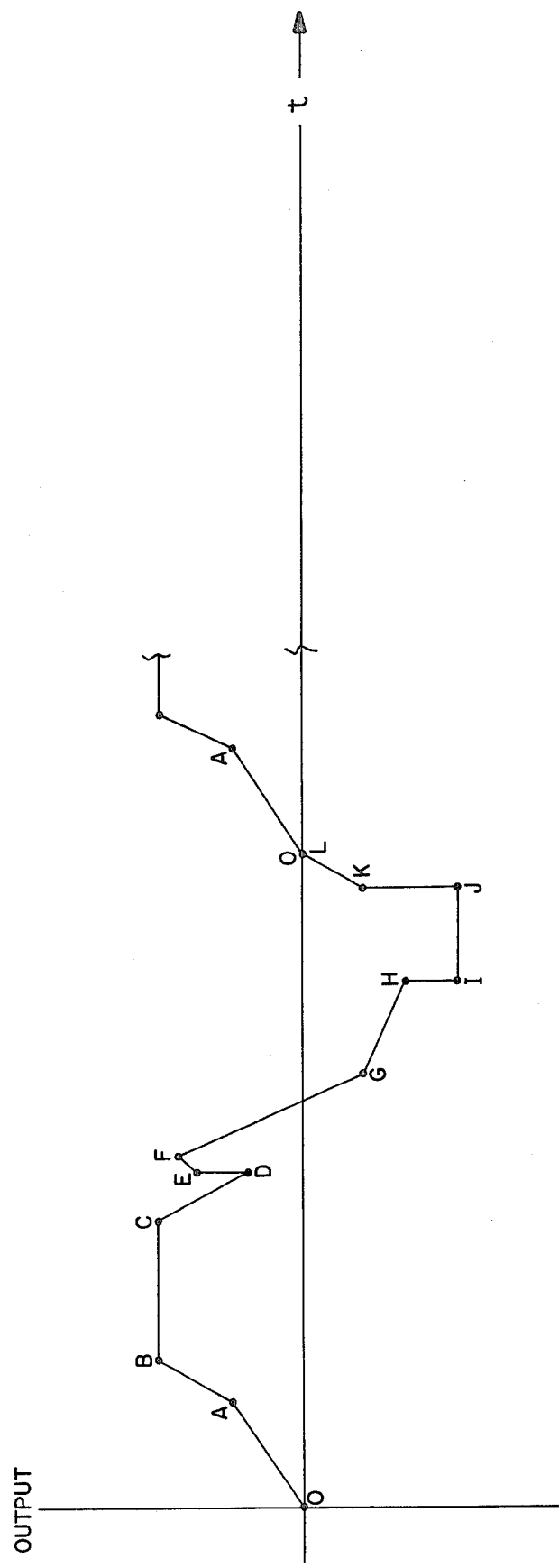
FIG. 3 is a graph showing an example of a waveform which illustrates the operation of the digitally programmed arbitrary waveform generator of the present invention.

Illustration of Operation-The Example Waveform of FIG. 3

FIG. 3 is an example of a complex arbitrary waveform which illustrates the various operations of the waveform generator of FIGS. 1 and 2. The waveform illustrated in FIG. 3 is a repetitive waveform which begins at point O and ends at point L. Between these two points, slope segments of both positive and negative slope, amplitude plateaus, and amplitude jumps are performed with both positive and negative outputs. It should be recognized, of course, that the waveform shown in FIG. 3 is shown simply to illustrate the various operations of the waveform geneator, and it is not necessarily representative of any particular waveform. With the waveform generator of the present invention, the waveforms may consist of more or less slope segments, amplitude plateaus, and amplitude jumps.

(a) Segment OA

The first segment of the waveform shown in FIG. 3 is the slope segment from point 0 to point A. This segment is generated using four words. The first word which is addressed contains a Load Amplitude Output Register Positive instruction. Instruction decoder 42 produces the LOAD COMMAND signal and register load sequencer 44 generates the LOAD PULSE signal, which cause the thirteen data bits from the first word (i.e. 12 bits and the polarity bit) to be loaded into amplitude output register 16. In the example shown in FIG. 3, this initial value is zero, but it could be either a positive or negative non-zero value, depending upon the particular waveform.

After the load operation is completed, register load sequencer 44 produces an ADVANCE signal which advances memory address counter 30 to the second word of the waveform program. This second word contains a Load Amplitude Comparison Register Positive instruction. The thirteen data bits of the second word are loaded into amplitude comparison register 18 in response to the LOAD COMMAND and LOAD PULSE signals. Memory address counter 30 is then advanced to the next word of the program.

The third word of the program contains a Load Slope Multiplier instruction. The LOAD COMMAND and LOAD PULSE signals cause clock multiplier control register 56 to receive and store twelve data bits contained in the third word. These data bits provide the input to clock multiplier 54 which controls the frequency of the CLOCK-1 signal. When the Load Slope Multiplier instruction has been executed, memory address counter 30 receives an ADVANCE signal and advances to the fourth word of the program.

The first three words are addressed and their instructions are executed at high speed, so that in most cases no noticeable aberration in the waveform appears. The fourth word contains a Ramp Command instruction. This instruction causes instruction decoder 42 to supply the OPERATE COMMAND signal to amplitude output register 16. This in turn causes amplitude output register 16 to begin counting in response to the CLOCK-1 signal from clock multiplier 54. Four of the data bits are supplied to clock divide and select circuitry 52 to select the particular decode frequency of the CLOCK-2 signal, and therefore of the CLOCK-1 signal. Because the value of the end point stored in amplitude comparison register 18 is positive and greater than the count contained in amplitude output register 16, comparator 22 causes amplitude output register 16 to count up in response to the CLOCK-1 signals. Amplitude output register 16 continues to count, and the output continues to increase at a rate determined by the frequency of the CLOCK-1 signal until the count in amplitude output register 16 equals the end point count contained in amplitude comparison register 18. This represents point A of the OA segment. Comparator 22 produces the RAMP COMPLETE signal to memory address counter 30, which advances memory address counter 30 to the fifth word of the program. The ramp operation is terminated and no further counting of amplitude output register 16 is performed until an OPERATE COMMAND signal is again received by amplitude output register 16.

(b) Segment AB

Segment AB is the next segment of the waveform, and is generated by the fifth, sixth, and seventh words of the program. The fifth word of the program contains a Load Amplitude Comparison Register Positive instruction. This causes the new end point count to be stored in amplitude comparison register 18. In the example shown in FIG. 3, this new end point B is positive and greater than end point A of the first slope segment. Because point A represents not only the end point of the first slope segment, but also the start point of the second slope segment, the count in amplitude output register 16 does not require changing.

As soon as the Load Amplitude Comparison Register Positive instruction is executed, memory address counter 30 is advanced to the sixth word of the program. The sixth word contains a Load Slope Multiplier instruction, and clock multiplier control register 56 is loaded with the data bits from the sixth word. As shown in FIG. 3, slope segment AB has a greater slope than segment OA. As a result, the data bits supplied by the sixth word must specify a greater slope or velocity, thereby causing a higher frequency for the CLOCK-1 signal.

After the Load Slope Multiplier instruction is completed, memory address counter 30 advances to the seventh word of the program. This seventh word contains another Ramp Command instruction, and amplitude output register 16 again receives an OPERATE COMMAND signal from instruction decoder 42. Similarly, clock divide and select circuitry 52 receives four data bits which select the decade frequency of the CLOCK-2 signal. Amplitude output register 16 is again counted up at the rate determined the the CLOCK-1 signal. Since the CLOCK-1 signal has a higher frequency during the generation of the segment AB than it had during the segment OA, segment AB has a greater slope. When the count in amplitude output register 16 again equals the end point contained in amplitude comparison register 18, comparator 22 provides another RAMP COMPLETE signal to memory address counter 30. This advances the memory address counter to the eighth word of the program.

(c) Segment BC

The next segment of the waveform is segment BC, which is an amplitude plateau. To generate this amplitude plateau, the eighth and ninth words are used. The eighth word is a Load Amplitude Comparison Register Positive instruction. Amplitude comparison register 18 is loaded with a count which will be decremented to zero by the CLOCK-2 signal when the delay or plateau operation is performed. When the amplitude comparison register 18 has been loaded, memory address counter 30 receives an ADVANCE signal from register load sequencer 44 and is advanced to the ninth word of the program.

The instruction contained in the tenth word is a Delay Command, which actually causes generation of the amplitude plateau. As in the case of a Ramp Command, four data bits contained in the same word as the Delay Command instruction select the CLOCK-2 decade frequency. Instruction decoder 42 provides an OPERATE COMMAND signal which selects and actuates amplitude comparison register 18. The count contained in amplitude comparison register 18 is counted down in response to the CLOCK-2 signal until it reaches zero. Zero detect circuit 24 senses when the count in amplitude comparison register 18 reaches zero, and provides a DELAY COMPLETE signal to memory address counter 30. This causes memory address counter 30 to terminate the delay operation by advancing to the tenth word of the program.

(d) Segment CD

The next segment CD is of negative slope, and is generated by the tenth, eleventh, and twelfth words. The tenth word of the program contains a Load Amplitude Comparison Register Positive instruction. Amplitude comparison register 18 is loaded with the data bits which represent the amplitude of end D of segment CD.

Memory address counter 30 is advanced to the eleventh word, which contains a Load Slope Multiplier instruction. The data bits representing the desired slope of segment CD are supplied to clock multiplier control register 56. These signals control the frequency of the CLOCK-1 signal during the generation of segment CD.

Memory address counter 30 receives an ADVANCE signal from register load sequencer 44 and advances to the twelfth word of the program. This twelfth word contains the Ramp Command instruction and the four CLOCK-2 frequency select data bits. Amplitude output register 16 receives the OPERATE COMMAND signal from the instruction decoder 42 and begins counting in response to the CLOCK-1 signal. Because the magnitude of the output count in amplitude output register 16 is greater than the magnitude of the end point count contained in amplitude comparison register 18, comparator 22 causes the amplitude output register 16 to count down in response to the CLOCK-1 signals. This counting continues until the output count equals the end point count. Comparator 22 produces the RAMP COMPLETE signal which advances memory address counter 30 to the thirteenth word of the program.

(e) Segment DE

Segment DE of the waveform is an amplitude jump. This portion of the waveform is produced with only the thirteenth word, which contains a Load Amplitude Output Register Positive instruction. The amplitude output register 16 is loaded with the count corresponding to the end point E of segment DE, and memory address counter 30 is advanced to the next word.

(f) Segment EF

Segment EF is another slope segment with a positive slope, and is generated by the fourteenth, fifteenth, and sixteenth words. The fourteenth word of the program contains a Load Amplitude Comparison Register Positive instruction, the fifteenth word contains a Load Slope Multiplier instruction, and the sixteenth word contains a Ramp Command instruction. Amplitude output register 16 is counted up at a rate determined by the CLOCK-1 signal until the output count equals the end point count contained in amplitude comparison register 18 which corresponds to point F of segment EF.

(g) Segment FG

The next segment, FG, begins with a positive value F and ends with a negative end point G. The seventeenth, eighteenth, and nineteenth words of the program are used to generate segment FG. The seventeenth word contains a Load Amplitude Comparison Register Negative instruction, which causes a negative end point count to be loaded into amplitude comparison register 18. The eighteenth word contains a Load Slope Multiplier instruction which loads the desired slope of segment FG into clock multiplier control register 56. The nineteenth word contains a Ramp Command instruction.

The generation of segment FG involves the counting down from a positive count contained in amplitude output register 16 through zero to the negative value contained in amplitude comparison register 18. To achieve this result, certain logic rules are used to control whether amplitude output register 16 counts up or counts down. Both the amplitude output register count and the amplitude comparison register count contain a polarity bit which indicates whether the count is negative or positive. If the count in amplitude output register 16 has the same polarity as its end point contained in amplitude comparison register 18, and the magnitude of the count in amplitude output register 16 is less than its end point, then amplitude output register 18 is counted upward until equality is reached. In all other cases it is counted down.

In the generation of segment FG, amplitude output register 16 is counted down to zero. At that point, the polarity bit is changed to indicate the output count in amplitude output register 16 is now negative. Since both the end point count in amplitude comparison register 18 and the output count in amplitude register 16 are then of the same sign or polarity (negative) and the magnitude of the end point exceeds the magnitude of the output count, amplitude output register 16 is counted up until euqliaty is reached. Comparator 22 then produces the RAMP COMPLETE signal which advances memory counter 30 to the next word.

(h) Segment GH

Segment GH proceeds from a negative point G to a more negative point H. Segment GH is generated by the twentieth, twenty-first, and twenty-second words. The twentieth word contains a Load Amplitude Comparison Register negative instruction, which loads the amplitude of end point H into amplitude comparison register 18. The twenty-first word contains a Load Slope Multiplier instruction, which loads clock multiplier control register 56. The twenty-second word contains the Ramp Command instruction.

Because the amplitude output register 16 and amplitude comparison register 18 both contain negative counts and the magnitude of the count contained in amplitude comparison register 18 is greater than the output count contained in amplitude output register 16, the CLOCK-1 pulses count up the amplitude output register 16 until end point H is reached.

(i) Segment HI

Segment HI is an amplitude jump. The twenty-third word contains a Load Amplitude Output Register Negative instruction which causes a more negative value corresponding to end point I to be loaded into amplitude output register 16.

(j) Segment IJ

Segment IJ is an amplitude plateau. It is generated in a manner similar to segment BC by the twenty-fourth and twenty-fifth words. The twenty-fourth word contains Load Amplitude Comparison Register Positive instruction, and the twenty-fifth word contains a Delay Command instruction and the four bits that select the CLOCK-2 frequency decade. When the count contained in amplitude comparison register 18 is counted to zero, zero detect 24 produces a DELAY COMPLETE signal to memory address counter 30 which advances to the twenty-sixth word of the program.

(k) Segment JK

Segment JK is an amplitude jump from negative point J to a less negative point K. The twenty-sixth word contains a Load Amplitude Output Register Negative instruction which loads the end point K into amplitude output register 16. After loading operation is complete, register load sequencer 44 produces an ADVANCE signal, which advances memory address counter 30.

(l) Segment KL

Segment KL is a slope segment which is produced by the twenty-seventh, twenty-eighth, and twenty-ninth words of the program. The twenty-seventh word contains a Load Amplitude Comparison Register Negative instruction which loads the desired end point count into amplitude comparison register 18. In the particular example shown in FIG. 3, the end point count of segment KL is zero.

The twenty-eighth word contains a Load Slope Multiplier instruction. The desired frequency of the CLOCK-1 signal is determined by the data bits contained in the twenty-eighth word.

The twenty-ninth word contains the Ramp Command. Because both points K and L have the same polarity and the magnitude of the output count in amplitude output register 16 is greater than the desired end point count contained in amplitude comparison register 18, amplitude output register 16 is counted down in response to the CLOCK-1 signal until end point L is reached. Comparator 22 produces the RAMP COMPLETE signal which advances the memory address counter 30.

(m) Segment OA of the Repeated Waveform

In the example shown in FIG. 3, the waveform is a repetitive waveform. The thirtieth and last word of the program contains an Address Return Jump instruction. Instruction decoder 42 produces the JUMP COMMAND signal, and when register load sequencer 44 produces the JUMP PULSE signal, memory address counter 30 loads the contents of the thumbwheel switches 34 as its new count. Thumbwheel switches 34 contain the address of the first word of the program, which begins again the waveform starting with segment OA. The waveform is repeated by the waveform generator until the operator changes thumbwheel switches 34 to an address which produces another waveform or stops the waveform generator.

Figure 4:
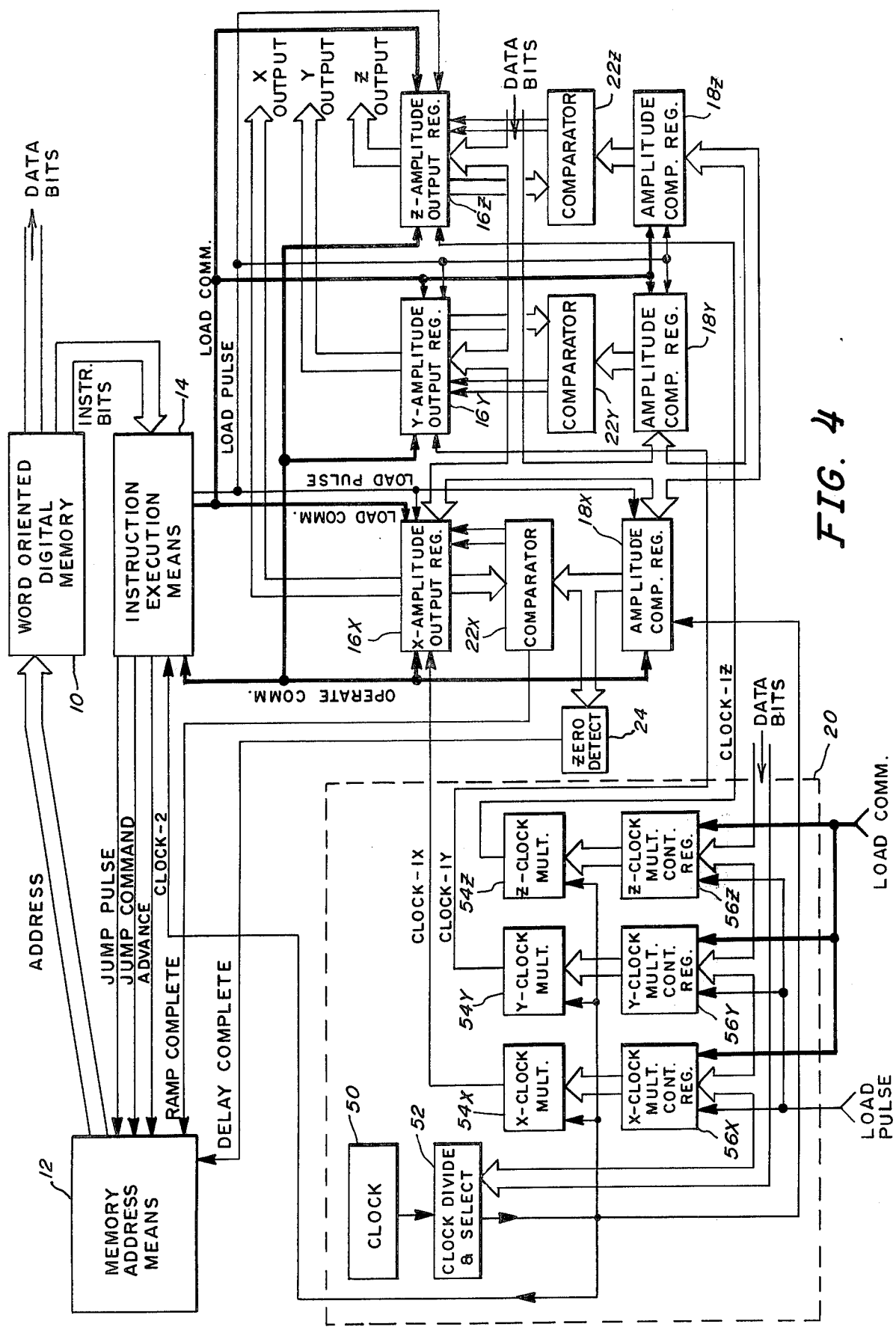
FIG. 4 is an electrical block diagram of an embodiment of the present invention which provides three simultaneous output waveforms.

The Multiple Output Waveform Generator of FIG. 4

As discussed previously, the multi-word programming used in the arbitrary waveform generator of the present invention permits multiple output waveforms to be generated with a minimum of additional hardware. FIG. 4 illustrates one embodiment of the arbitrary waveform generator of the present invention which provides three simultaneous output waveforms. These three outputs have been arbitrarily labeled the X output, the Y output, and the Z output.

The arbitrary waveform generator of FIG. 4 is generally similar to the embodiments of the present invention shown in FIGS. 1 and 2, and similar numerals have been used to designate similar elements. Since most of the elements and their functions have been described in detail with reference to FIGS. 1 and 2, a detailed discussion of the entire waveform generator of FIG. 4 is not necessary.

In FIG. 4, the X, Y and Z output waveforms are derived from the counts contained in amplitude output registers 16X, 16Y, and 16Z, respectively. Clock circuitry 20 includes clock 50, clock divide and select circuitry 52, three clock multipliers 54X, 54Y, and 54Z, and three clock multiplier control registers 56X, 56Y, and 56Z. Rather than supplying only a single CLOCK-1 signal (as in FIGS. 1 and 2), clock circuitry 20 supplies a CLOCK-1X signal to amplitude output register 16X, a CLOCK-1Y signal to amplitude output register 16Y, and a CLOCK-1Z signal to amplitude output register 16Z.

As illustrated in FIG. 4, comparators 22X, 22Y, and 22Z, and amplitude comparison registers 18X, 18Y and 18Z are provided. During a ramp operation in the X output waveform, comparator 22X compares the output count in amplitude output register 16X with the end point count contained in amplitude comparison register 18X, comparator 22Y compares the output count in amplitude output register 16Y with the end point count in amplitude comparison register 18Y, and comparator 22X compares the output count in amplitude output register 16Z with the end point count in amplitude comparison register 18Z. In this particular embodiment, the X output is selected as the most significant output, and all segments of the three output waveforms are based upon the time required to complete the segment being generated by amplitude output register 16X.

While X amplitude output register 16X is being operated to generate a ramp segment, the Y and Z amplitude output registers 16Y and 16Z may also be ramped in response to the CLOCK-1Y and CLOCK-1Z signals, or may be held constant, as however desired. Similarly, during a constant-amplitude interlude in the X output, the Y or Z outputs may be changed by counting in response to the CLOCK-1Y and CLOCK-1Z signals, respectively.

The multiple word programming of the present invention also permits each of the amplitude output registers 16X, 16Y, and 16Z to receive amplitude jumps simply by being loaded with the new output count. As described previously, the amplitude jump operation takes a very short period of time, and requires only a single digital word. As a result, an amplitude jump in any one of the three output waveforms produces no noticeable abberation in the other two output waveforms.

In one embodiment of the present invention, amplitude output registers 16Y and 16Z may receive a small correction to their output counts after a ramp or amplitude plateau operation has been performed on the X output waveform. Residual errors in any axis remaining after such a primary ramp operation may be corrected if necessary, by minor corrective ramping in each axis affected. The present invention, which provides multiple word programming to generate each waveform segment, is well adapted to making minor corrections of this type.

As illustrated in FIG. 4, the present invention permits the production of a multiplicity of simultaneous output waveforms with a minimum of additional hardware. All that is required to increase the number of output waveforms is to add an additional amplitude output register, clock multiplier control register, and clock multiplier. It is not necessary to duplicate all of the hardware required for one output waveform in order to add another simultaneous output waveform.

Although FIG. 4 has illustrated a system in which three simultaneous output waveforms are generated, in some applications only one or two output waveforms are required, and in other applications, even more than three output waveforms can be provided. The present invention permits great flexibility in the number of output waveforms produced with a minimum of additional hardware and a minimum of additional cost.

CONCLUSION

The digitally programmed arbitrary waveform generator of the present invention produces a wide variety of arbitrary waveforms by means of slope segments, amplitude plateaus, and amplitude jumps. Despite its great flexibility and adaptability in providing arbitrary waveforms, the waveform generator is both simple in construction and simple to use.

First, high accuracy and resolution is achieved by the present invention. In the preferred embodiments described above, twelve bits of resolution are provided for amplitude and slope, and for the duration of amplitude plateaus.

Second, the present invention reduces hardware complexity, thereby yielding a more reliable waveform generator and also reducing the cost of the waveform generator. Hardware and/or software for subtracting or dividing counts in order to generate slope rates, as required in some prior art systems, is not required in the present invention.

Third, despite the high accuracy and resolution, the reduced hardware complexity, and the great flexibility of the present invention, the memory requirements of the waveform generator are minimized because the waveforms are simulated by slope segments, amplitude plateaus, and amplitude jumps.

Fourth, the waveform generator of the present invention makes programming extremely simple. Only three words are required to produce slope segments, only two words are needed to generate amplitude plateaus, and only a single word is needed to produce an amplitude jump. The program repertoire is extremely simple, and in the examples discussed, it consists of only ten instructions. In addition, the present invention does not require designation of slope sign (either positive or negative). Instead, the waveform generator automatically determines the slope sign by comparing the output count and the end point count when determining whether the amplitude output register 16 counts up or counts down.

Fifth, the present invention permits both negative and positive output values with no difficulty. The waveform may extend from positive to negative values and back, and is not confined to one polarity.

Sixth, the present invention may provide independent timed outputs or programmed trigger outputs in addition to the waveform output. The use of the Delay Command and No Operation instructions and the data bits associated with those instructions provides great flexibility in terms of independent timed outputs, and programmed trigger outputs.

Seventh, the present invention is particularly well suited for providing multiple simultaneous output waveforms.

Eighth, the control instructions for the generator can be stored either in an internal word oriented memory like memory 10 shown in FIGS. 1 and 2, or can be transmitted in digital form from an external source. This permits external control of the waveform generator when desirable.

Ninth, the digital nature of the waveform generator eliminates the drift and other inaccuracies inherent in the prior art analog electrical systems and electromechanical systems.

Tenth, the present invention may produce waveforms as a function of independent variables other than time. Although the specific embodiments described have shown the generated waveforms as functions of time, other independent variables (such as angle) can be used to release clock pulses. Clock pulses can be generated at rates dependent on angular rotation (e.g. 1 pulse per milliradian of rotation), whether this rotation is at a constant rate or not.

Although the present invention has been described with reference to preferred embodiments, workers skilled in the art will recognize that changes may be made in form and detail without departing from the spirit or scope of the invention.

What is claimed is:

1. Apparatus for generating waveforms, the apparatus comprising:
   variable clock means for providing pulses at a rate determined by digital data loaded into the variable clock means;
   amplitude output means for containing an output count;
   amplitude comparison register means for containing an end point count;
   word oriented digital memory means for storing a plurality of digital words containing instructions and data;
   memory address means for addressing digital words in the word oriented digital memory means in a predetermined order;
   instruction execution means for executing the instruction contained in each digital word addressed by the memory address means, the instructions executed by the instruction execution means including a first load instruction for loading the data from a digital word into the amplitude comparison register means, a second load instruction for loading the data from a digital word into the variable clock means, and a ramp instruction for enabling the amplitude output means to count toward the end point count contained in the amplitude comparison register means in response to pulses from the variable clock means; and comparator means for comparing the output count contained in the amplitude output means and the end point count contained in the amplitude comparison register means during a ramp operation and producing a ramp complete signal when the output count equals the end point count, the ramp complete signal indicating to the memory address means that the ramp operation is complete.

2. The apparatus of claim 1 wherein the instructions executed by the instruction execution means further include a third load operation for loading the data from a digital word into the amplitude output means.

3. The apparatus of claim 1 and further comprising:
means for containing a delay count;
detect means for detecting when the delay count reaches a predetermined count and providing a delay complete signal to indicate to the memory address means that a delay operation is complete;
clock means for providing clock pulses; and
wherein the instructions executed by the instruction execution means further include a load instruction for loading the data from a digital word into the means for containing a delay count, and a delay instruction for enabling the means for containing a delay count to count toward the predetermined count in response to clock pulses from the clock means.

4. The apparatus of claim 3 wherein the means for containing the delay count comprises the amplitude comparison register means and wherein the load instruction for loading data into the means for containing a delay count comprises the first load instruction.

5. The apparatus of claim 3 wherein the instruction execution means produces an operate command signal which enables the means for containing the delay count in response to a delay instruction.

6. The apparatus of claim 3 and further comprising:
means for deriving an independent timed output from data contained in a digital word containing a delay instruction.

7. The apparatus of claim 1 and further comprising output means for deriving an output waveform from the output count of the amplitude output means.

8. The apparatus of claim 1 wherein the variable clock means comprises:
clock means for providing clock signals;
clock multiplier control register means for containing the data loaded in response to a second load instruction; and
clock multiplier means for receiving clock signals from the clock means and providing pulses at a rate determined by the data contained in the clock multiplier control register means.

9. The apparatus of claim 8 wherein the variable clock means further comprises:
clock divide and select circuitry for receiving the clock signals from the clock means and providing one of a plurality of different frequency clock signals to the clock multiplier means, the clock divide and select circuitry selecting one of the plurality of different frequency clock signals as a function of data from a digital word containing a ramp instruction.

10. The apparatus of claim 1 wherein the comparator means further provides count-up and count-down control signals to the amplitude output means to control whether the output count of the amplitude output register is incremented or decremented during a ramp operation.

11. The apparatus of claim 10 wherein the comparator means provides a count-up control signal to the amplitude output means when the output count and the end point count have the same polarity and the magnitude of the output count is less than the end point count, and wherein the comparator means provides a count-down control signal to the amplitude output means in all other cases.

12. The apparatus of claim 11 wherein the comparator means changes the polarity of the output count in the amplitude output means if the output count during a ramp operation reaches zero and does not equal the end point count.

13. The apparatus of claim 1 wherein the instruction execution means produces, in response to a load instruction, a load command signal which selects the amplitude output means, the amplitude comparison register means, or the variable clock means, and a load pulse signal which causes data from the digital word containing the load instruction to be loaded into the amplitude comparison register means, the amplitude output means, or clock means selected by the load command signal, and produces an advance signal which causes the memory address means to address the next digital word in the predetermined order after the load instruction has been executed.

14. The apparatus of claim 13 wherein the instruction execution means further produces an operate command signal which enables the amplitude output means in response to a ramp instruction.

15. The apparatus of claim 1 wherein the instructions executed by the instruction execution means further include an address jump instruction for causing the memory address means to address a preselected digital word.

16. The apparatus of claim 15 wherein the instruction means provides a jump command signal and a jump pulse signal to the memory address means in response to an address jump instruction, the occurrence of the jump command signal and the jump pulse signal causing the memory address means to address the preselected digital word.

17. The apparatus of claim 1 wherein the instructions executed by the instruction execution means further include a no operation instruction for causing the memory address means to advance to the next digital word in the predetermined order.

18. The apparatus of claim 17 and further comprising:
means for deriving output signals from the data from a digital word containing a no operation instruction.

19. The apparatus of claim 1 wherein the instruction execution means comprises:
instruction decoder means for receiving the instruction contained in the digital word addressed by the memory address means, the instruction decoder means providing load command, operate command, jump command, and sequencer trigger signals as a function of the instruction received, and
register load sequencer means for providing a sequence of pulse signals, including a load pulse signal, a jump pulse signal, and an advance signal, in response to a sequencer trigger signal from the instruction decoder means.

20. The apparatus of claim 19 wherein the register load sequencer means comprises counter means which, upon receiving the sequencer trigger signal, counts through a predetermined sequence in response to clock signals from the variable clock means.

21. The apparatus of claim 1 wherein the memory address means comprises:
   memory address counter means for counting, in response to an advance signal from the instruction execution means and a ramp complete signal from the comparator means.

22. The apparatus of claim 21 wherein the memory address counter means further counts in response to a delay complete signal which indicates the end of a delay operation.

23. The apparatus of claim 21 wherein the memory address means further comprises:
   address select means for providing a preselected memory address; and
   wherein the instructions executed by the instruction execution means further includes an address jump instruction for loading the preselected address into the memory address counter means as the address of the next digital word to be addressed.

24. The apparatus of claim 21 wherein the memory address means further includes:
   memory inspection means for incrementing and decrementing the memory address counter means to inspect the contents of the word oriented digital memory.

25. The apparatus of claim 24 wherein the memory inspection means comprises:
   up-down jog circuitry for supplying count-up or count-down signals to the memory address counter means;
   address display means for displaying the address contained in the memory address counter means; and
   data display means for displaying the data contained in an addressed word of the word oriented digital memory means.

26. The apparatus of claim 1 and further comprising:
   second variable clock means for providing pulses at a rate determined by digital data loaded into the second variable clock means;
   second amplitude output means for containing a second output count; and
   wherein the instructions executed by the instruction execution means include a load instruction for loading the data from a digital word into the second variable clock means and a ramp instruction for enabling the second amplitude output means to count in response to pulses from the second variable clock means.

27. Apparatus for generating waveforms in the form of slope segments, amplitude plateaus, and amplitude jumps, the apparatus comprising:
   variable clock means for providing pulses at a rate determined by a pulse rate count;
   amplitude output means for containing an output count;
   amplitude comparison register means for containing an end point count;
   means for containing a delay count;
   memory means for storing a plurality of digital words containing instructions and data, the digital words including:
      a word including a new output count and an instruction to load the amplitude output means;
      a word containing an end point count and instruction to load the amplitude comparison register means;
      a word containing a pulse rate count and an instruction to load the variable clock means;
      a word containing a delay count and an instruction to load the means for containing a delay count;
      a word containing a ramp instruction; and
      a word containing a delay instruction;
   memory address means for addressing digital words in the memory means in a predetermined order;
   instruction execution means for executing the instructions contained in the digital words addressed by the memory address means;
   comparator means for comparing the output count contained in the amplitude output means and the end point count contained in the amplitude comparison regisrer means during a ramp operation and providing a ramp complete signal when the output count equals the input count, the ramp complete signal indicating to the memory address means that the ramp operation is complete; and
   detect means for detecting when the delay count reaches a predetermined count during a delay operation and providing a delay complete signal to indicate to the memory address means that a delay operation is complete.

28. The apparatus of claim 27 wherein the means for containing a delay count comprises the amplitude comparison register means.

29. The apparatus of claim 28 wherein the instruction execution means enables the amplitude output means to count toward the end point count in response to pulses from the variable clock means during a ramp operation, and enables the amplitude comparison register means to count toward the predetermined count in response to pulses from the variable clock means during a delay operation.

30. Apparatus for generating first and second waveforms, the apparatus comprising:
   first variable clock means for providing first pulses at a first rate determined by a first pulse rate count;
   second variable clock means for providing second pulses at a second rate determined by a second pulse rate count;
   first amplitude output means for containing a first output count;
   second amplitude output means for containing a first output count;
   first amplitude comparison register means for containing a first end point count;
   second amplitude comparison register means for containing a second end point count;
   memory means for storing a plurality of digital words containing instructions and data, the digital words including:
      a word containing a first end point count and an instruction to load the first amplitude comparison register means;
      a word containing a second end point count and an instruction to load the second amplitude comparison register means;
      a word containing a first pulse rate count and an instruction to load the first variable clock means;
      a word containing a second pulse rate count and an instruction to load the second variable clock means;
      a word containing a ramp instruction;

memory address means for addressing digital words in the memory means in a predetermined order;

instruction execution means for executing the instructions contained in the digital words addressed by the memory address means;

first comparator means for comparing the first output count contained in the first amplitude output means and the first end point count contained in the first amplitude comparison register means during a ramp operation and providing a ramp complete signal when the output count equals the input count, the ramp complete signal indicating to the memory address means that the ramp operation is complete; and second comparator means for comparing the second output count contained in the second amplitude output means and the second end point count contained in the second amplitude comparison register means during a ramp operation.

* * * * *